United States Patent [19]

Moulton

[11] 4,410,006
[45] Oct. 18, 1983

[54] DAMPER VALVE

[75] Inventor: Alexander E. Moulton, Bradford-on-Avon, England

[73] Assignee: Moulton Developments Limited, Wiltshire, England

[21] Appl. No.: 311,143

[22] Filed: Oct. 13, 1981

[30] Foreign Application Priority Data

Oct. 17, 1980 [GB] United Kingdom ............... 8033667

[51] Int. Cl.³ ............................................ F16K 17/18
[52] U.S. Cl. ............................ 137/493.8; 137/512.15; 137/854; 188/322.13; 267/64.24
[58] Field of Search ............ 137/493.8, 512.15, 512.4, 137/854–858; 188/281, 282, 298, 322.13, 322.14, 322.15; 267/64.23, 64.24

[56] References Cited

U.S. PATENT DOCUMENTS

| 2,748,898 | 6/1956 | Carbon | 137/493.8 X |
| 3,361,422 | 1/1968 | Theuleau | 188/281 X |
| 3,811,468 | 5/1974 | Bellmer | 137/512.15 |
| 3,831,626 | 8/1974 | Peddinghaus | 137/493.8 |
| 3,911,546 | 10/1975 | Schrock | 137/512.15 X |
| 3,957,140 | 5/1976 | Overkott | 137/493.8 X |

FOREIGN PATENT DOCUMENTS 2044404 10/1980 United Kingdom ............ 137/493.8

Primary Examiner—Robert G. Nilson
Attorney, Agent, or Firm—Dennison, Meserole, Pollack & Scheiner

[57] ABSTRACT

The invention relates to a damper valve for arrangement in a liquid conduit to control flow through the conduit in both directions, and of the kind comprising an apertured port plate with resilient flaps covering the ports so that fluid flow can only take place unidirectionally through a flap covered port. The valve also has a pair of main bump ports (11) covered by a centrally anchored elongate metal leaf (12) disposed on a first side of the port plate (10); a pair of rebound ports (13) similarly covered by a centrally anchored elongate metal leaf (14) disposed on the second side of the port plate (10); said pairs of bump and rebound ports (11 and 13) being of generally similar size. The invention is characterized in that there are provided at locations substantially co-planar with said main bump ports, two blow-off bump ports (16) which are larger than said main bump ports (11), which blow-off bump ports are covered by a separate centrally anchored bow-shaped metal leaf spring (17) which bridges the leaf spring (12) closing the main bump ports (11) and which spring (17) has its ends curved inwardly and shaped to constitute a pair of valving flaps, which inwardly curved flaps are preloaded against the blow-off bump ports (16) to such extent that said blow-off bump ports (16) are arranged to open only when the fluid pressure, in bump flow, rises substantially above the pressure corresponding to opening of the main bump valve ports (11).

7 Claims, 9 Drawing Figures

DAMPER VALVE

This invention relates to vehicle wheel suspension systems; to fluid shock absorber devices forming part of such systems; and in particular to two-way damper valves of the flexible flap type used to damp wheel oscillations by controlling fluid flows in such shock absorber devices.

Specifically this invention relates to a two-way double acting damper valve assembly arranged in a liquid flow conduit to control flow in both directions therethrough and of the general type comprising a port plate disposed across the conduit and anchored to its walls, the plate having apertures consitituting valving ports, with some or all of said ports being covered by flexible metal flaps each arranged to prevent flow in one direction through a port so covered, while permitting flow in the opposite direction through that port.

Such a valve will be double acting in the sense that it will control "bump" flow when the wheel rises, and "rebound" flow when the wheel falls relative to the vehicle body structure.

A study of the damping requirements for a double acting damper valve arrangement arranged to control liquid flow in order to damp oscillations of a vehicle wheel relative to the body structure of the vehicle will show that there are in the main three shock regimes which require to be catered for as follows:

a. Low Level Shock

In this regime the wheel rises (in bump) or falls (in rebound) relatively slowly relative to the vehicle body structure. This corresponds to a condition where the damping liquid flows past the two-way damper valve in low volume and at low velocity. The damping requirement for bump flow and for rebound flow are not significantly different.

b. Medium Level Shock

In this regime the fluid flow in both bump and rebound is at higher volume and at greater velocity. It is common to provide for different damping characteristics in the bump and rebound flow conditions.

c. High Level Shock

Volume and velocity of flow are both very high in the bump condition. Such high flows must be permitted to prevent the shock forces being transmitted to the vehicle body as the wheel rises sharply. However, on the return oscillation, in rebound, following a bump shock oscillation, the return flow of damping fluid is not at very high velocity and can be damped normally as in the medium level shock regime.

These three regimes are not of course distinct, since on the contrary, they merge or overlap. Indeed it is desirable to avoid any transitional effect which is sharp or abrupt.

Various prior proposals utilizing metal flaps to cover the ports of damper valves have been made. Reference is made to U.S. Pat. Nos. 3,003,596 and 3,003,597; United Kingdom specification Nos. 984,779 and 1,453,004 or German patent specification Nos. 1,142,348 and 1,142,471, or to French patent specification No. 1,543,406. All of these specifications relate to damper valve systems employed in shock absorbers. In each case the valve is a flexible metal flap. But in each, the flaps are constituted by annular discs of spring steel. Where such discs are mounted on one side of a port plate to obturate ports in the plate, it is difficult to give different characteristics to different parts of the disc and the variation in size which is possible for the different ports covered by the same valving disc allows the engineer only limited scope if his object is to provide, using a single port plate, main bump valves as well as blow off valves, with very different flow control characteristics.

The use of flaps constituted from elongate leaves of spring metal, as distinct from discs, is known per se, from German patent specification No. 2,364,833 or from German Offenlegungsschrift No. 2,364,227. However neither of these proposals is concerned with the provision of main bump damping and in addition blow-off bump damping to accommodate widely different types of shock load. Accordingly only a limited range of flow, in speed or volume, of the damping fluid, can be controlled according to the valves of these prior proposals.

The present invention has for its object to provide a double acting flap-type damper valve assembly of the type which employs elongate flexible steel leaves as valve control flaps and which caters for the three main regimes specified above; which avoids any sharp transitional effects; which can be adapted to cater for the varying bump/rebound damping characteristics within the regimes; and above all which is predictable in operation throughout its intended working like, and in particular when the valve is manufactured in large scale for utilization as a shock absorber for controlling the oscillation between a wheel and the body of an automobile.

A further object is to provide a damper valve assembly which utilizes a single port plate which is arranged with all the controlled orifices necessary to damp fluid flow accompanying oscillations of a single wheel in an automobile wheel suspension system. It will be appreciated that in automobile wheel suspension systems saving of space and weight are important considerations along with performance, cost and reliability preferably for the whole expected working life of the vehicle.

Accordingly the invention provides a damper valve arranged in a liquid conduit to control flow through the conduit in both directions, and comprising an apertured port plate with resilient flaps covering the ports so that fluid flow can only take place unidirectionally through a flap covered port, the valve having
  a. a pair of main bump ports covered by a centrally anchored elongate metal leaf disposed on a first side of the port plate.
  b. a pair of rebound ports similarly covered by a centrally anchored elongate metal leaf disposed on the second side of the port plate.
  c. said pairs of bump and rebound ports being of generally similar size,
characterized in that there are provided at locations substantially co-planar with said main bump ports, two blow-off bump ports which are larger than said main bump ports, which blow-off bump ports are covered by a separate centrally anchored bow-shaped metal leaf spring which bridges the leaf spring closing the main bump ports and has its ends curved inwardly and shaped to constitute a pair of valving flaps, which inwardly curved flaps are preloaded against the blow-off bump ports to such extent that said blow-off bump ports are arranged to open only when the fluid pressure, in bump flow, rises substantially above the pressure corresponding to opening of the main bump valve ports.

Preferably, the bow shpaed blow-off leaf spring bridges the main bump leaf at 90°. This bridging configuration enables firstly that both leaves may be centrally anchored to the port plate by the same pin, and secondly that the main bump-flow control ports and the blow-off flow control ports can have their exits (or mouths which are closed by the respective flaps) substantially in the same plane. This gives the possibility of providing a very compact valve assembly while at the same time the designer is given some flexibility in selecting the sizes of the ports within the confine of the overall area or configuration of the port plate. At the same time the two leaves can be given different flexibilities or stiffnesses so that the engineer can provide components appropriate for the task each has to perform. Moreover, selected components may be interchanged with others having different characteristics, without affecting the performance of unchanged components. This is clearly advantageous as compared with the valves employing flexible annular discs as referred to above.

High level shock is catered for mainly by the pair of flap covered blow-off bump ports, the flaps preventing rebound flow. Medium and low level shocks in the two directions of flow, are catered for by the pair of flap covered bump ports and the pair of flap covered rebound ports.

Optionally, the port plate may have at least one through hole which is not covered by a flexible flap. Each such hole will be of much smaller size than any flap covered port and each such through hole will constitute a bleed port. The or each bleed port will cater for low level shock and its damping effect will be due to its small size, flow being permitted in both directions through it.

The metal leaves constituting the valving flaps are preferably of stainless steel. The port plate may be of sintered metal or a plastics material.

Preferably each flap covered port in the port plate is designed to have a good closure with its covering flap. To this end the port plate is formed with a narrow upstanding annular ridge surrounding the end of each hole which constitutes a flap covered port. The arm of the metal leaf which constitutes the flap bears on this ridge so that there is a thin annular line contact between the leaf and the ridge.

The metal leaves covering the main bump and rebound are planar elongate bodies of spring steel. The thickness of each leaf can be chosen for the appropriate or desired damping characteristic to the main bump or rebound valve. These leaves may be duplicated by shorter but similar elongate leaves or otherwise backed if great stiffness is required or in order to limit the flexing of the leaves. The thickness of each leaf may be 0.25-0.75 mm. The leaves covering the rebound valve ports may be substantially stiffer than those covering the main bump valve ports. Each leaf may be tapered in the region where it covers its respective port, such as to ensure a substantially even stress throughout the flexing part of the leaf as it deforms under fluid pressure to uncover its respective port.

The metal leaf covering the blow-off bump ports is of an entirely different design to the planar elongate preferably tapered leaves covering the other ports. The blow-off leaf is a single bow shaped leaf of spring steel anchored in its central region where it is urged towards the port plate. The legs extend from this restrained central region with a reverse or inward curvature to form the valve port covering flaps. At the extreme ends of the leaf, that is beyond its flap region covering a port, each leg may be curved through a further angle of say 30° to 50°. This forms a lip which helps to prevent the leaf from oscillating in a noisy manner resembling a reed. This leaf also may have, behind it, a backing member, which is shaped to control or limit the flexing of its end regions which constitute the blow-off port covering the flaps. The preloading of the flaps is advantageously achieved by pressing the central region of the bow shaped spring towards the port plate.

All the steel flaps are preferably carried upon a common central spigot. This can be employed in nut and bolt fashion to exert the required pressure to preload the bump blow-off leaf spring. Washers or spacers can limit the degree of preloading applied. If the central spigot has a D-shaped cross-section it can be employed to control the radial dispositions of the parts which it anchors on both sides of the common port plate thus ensuring correct location of the port closing flaps over their respective ports.

The invention will be further described with reference to the accompanying drawings in which.

Figure 1:
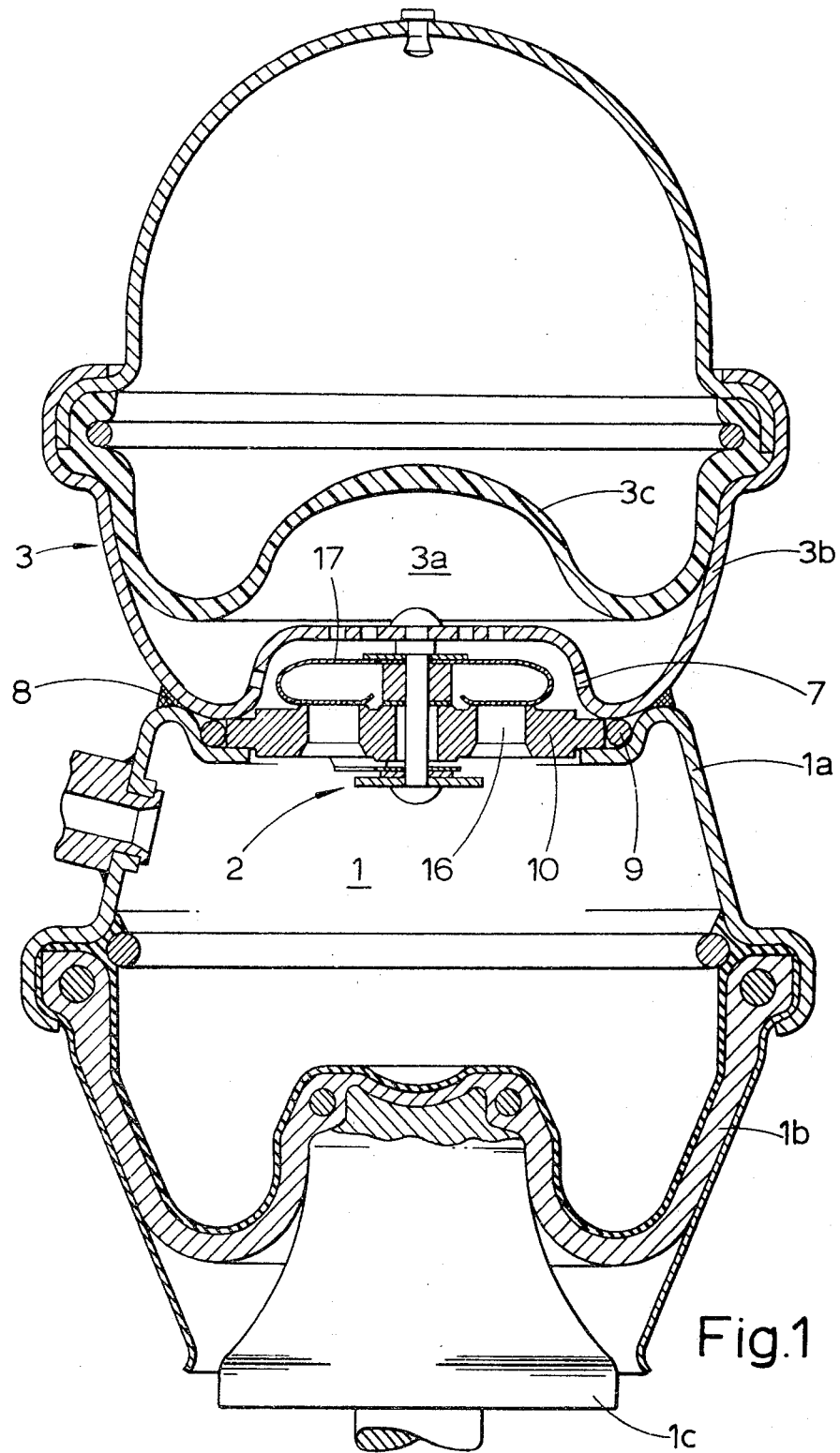
FIG. 1 shows a transverse cross section a vehicle wheel suspension unit equipped with a damper valve assembly, according to one embodiment of this invention, for controlling liquid flow between a diaphragm type hydraulic displacer chamber, and a hydropneumatic spring chamber of the unit.

Referring first to FIG. 1, there is here shown in transverse cross-section a suspension unit which is equipped with a damper valve according to the invention.

The suspension unit is of a well known type which includes a displacer chamber 1 which is filled with liquid and which is in liquid flow intercommunication by way of a damper valve assembly, generally designated 2, with a liquid filled chamber 3a of a hydropneumatic accumulator spring, generally designated 3.

The hydropneumatic accumulator spring, generally designated 3, consists of a rigid metal casing 3b defining an interior space which is separated into two parts by means of a separating diaphragm 3c. The space above the diaphragm 3c is filled with a gas at a pressure of, say 200 psi, and the separating diaphragm separates this gas from the liquid occupying the remainder of the space within the rigid casing 3b.

The hydraulic displacer chamber 1 is bounded in part by a rigid casing 1a and in part by a flexible diaphragm 1b. The diaphragm is acted upon by a piston 1c. As the piston 1c rises (as viewed in the drawing), liquid is displaced from the displacer chamber 1 past the damper valve assembly generally designated 2, the liquid being displaced into the liquid-filled part of the spring 3 to the displacer chamber 1 also by way of the damper valve, generally designated 2.

Tha damper valve assambly 2 essentially includes a port plate 10 which in this embodiment is annular. The port plate 10 is anchored at its periphery at the junction between displacer chamber casing member 1a and spring chamber casing member 3b, these casing members being secured by a weld at 8. 9 represents an annular sealing ring which together with the peripheral edge of the port plate 10, is trapped by a lip of the casing member 1a against the casing member 3a. The casing member 3b is provided with many apertures 7 to allow free flow of liquid to and from the spring chamber 3a.

Figure 8:
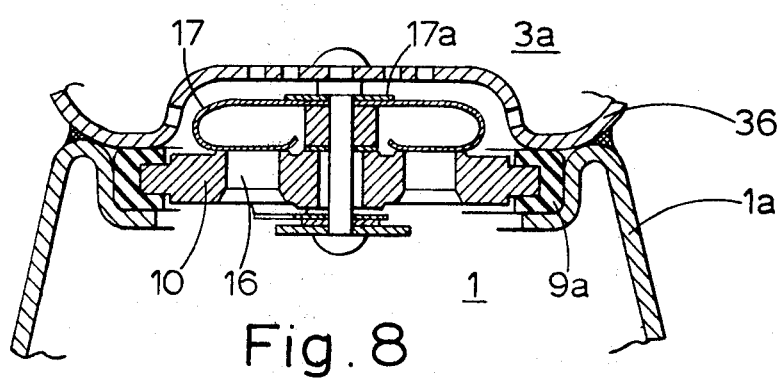
FIG. 8 is a cross-sectional view similar to part of the showing FIG. 1, but illustrating how the port plate may be afforded a resilient peripheral mounting in the conduit, flow through which the valve controls.

FIG. 8 shows a modified port plate mounting in which the peripheral edge of the port plate 10 is seated in a resilient mounting ring 9a which functions as a seal and as a cushion for damping transmission of noise which might occur in the event that the port plate oscillates under sharp liquid pressure changes.

The port plate 10 may be of sintered bronze or it may be of synthetic plastics material.

Figure 2:
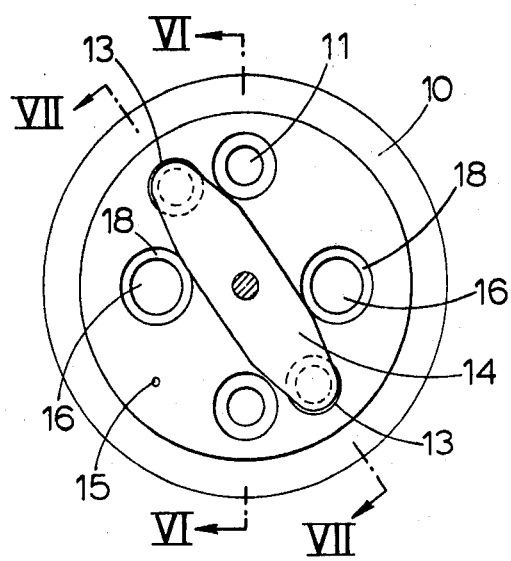
FIG. 2 shows in diagrammatic under-plan view, a port plate with a rebound valve control leaf in position over the rebound ports.
Figure 3:
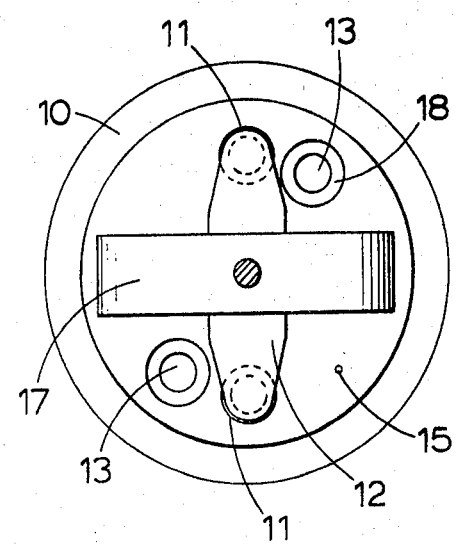
FIG. 3 shows in diagrammatic plan view the other side of the port plate of FIG. 2, with both bump valve and blow-off bump valve control leaves in position over the bump ports and the blow-off bump ports.

Opposite sides of the port plate 10 are shown in FIGS. 2 and 3. The port plate is apertured as follows:
  a. it has a pair of main bump flow ports 11 covered by a centrally anchored leaf 12;
  b. it has a pair of rebound flow ports 13 covered by a centrally anchored leaf 14;
  c. optionally it has at least one small hole 15 which is not covered by a valving flap and which therefore allows bleed flow in both directions past the port plate 10;
  d. the port plate 10 has a pair of blow-off bump flow ports 16 covered by a bow shaped bump blow-off control leaf 17, the ports 16 being substantially larger than the ports 11 and 13.

The port plate 10 is shaped to have a narrow upstanding ridge 18 surrounding the end of each of the ports 11, 13 and 16 for annular contact with the leaves covering these ports and for the purpose of obtaining port closure.

The ridge 18 terminates in a flat annular lip against which each port closing flap rests. The ridge 18 prevents the ingress of dirt which would prevent proper closing of the ports by the flaps. The lip unless it is unduly wide will be constantly swept clean of dirt by fluid issuing from its port. Preferably this lip has a radial width of between 0.25 mm and 1.25 mm. The height of the ridge is also important both to assist in displacing dirt and yet it must not be too high or noise may result. Preferably its height is between 0.5 mm and 1.2 mm.

The metal leaves 12 and 14 are planar bodies of resilient corrosion resistant steel. The blow-off valve leaf 17 is a bow shaped body of similar material.

The leaves 12, 14 and 17 are anchored in their central regions by an anchorage pin or spigot 20 passing through the port plate 10. In the example shown the spigot 20 also passes through casing member 3b.

The legs, or valve port covering flaps proper, of each leaf 12, 14 or 17 extend flexibly from the centrally anchored region of each leaf. In the case of the blow-off leaf 17, its legs are curved in reverse to form inwardly directed flaps, which terminate in lips curved through a further 30° to 50° and intended to prevent reed like oscillations.

The thickness of each leaf is chosen to give a stiffness appropriate to the damping characteristic required. In general, the thickness will however be from 0.25 mm to 0.75 mm.

Each leaf may be tapered in the region where it covers its respective port, such as to ensure a substantially even stress throughout the flexing part of the leaf as it deforms under fluid pressure to uncover its respective port.

Figure 4:
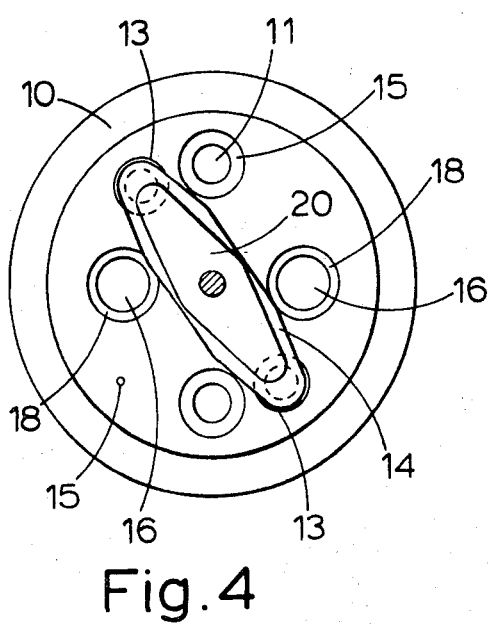
FIGS. 4 and 5 are views generally similar to FIGS. 2 and 3 but showing, in addition, reinforcing leaves behind the main bump and rebound valve control leaves.
Figure 5:
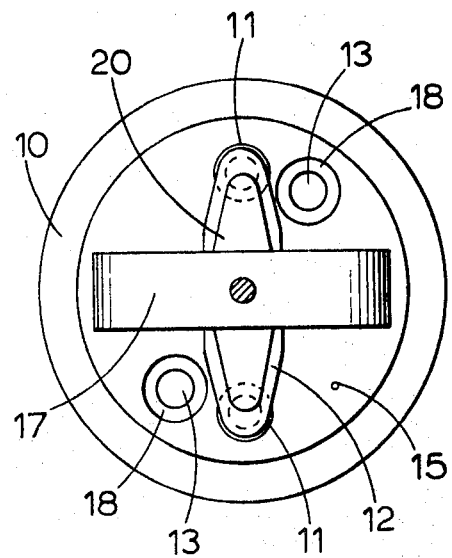
Figure 6:
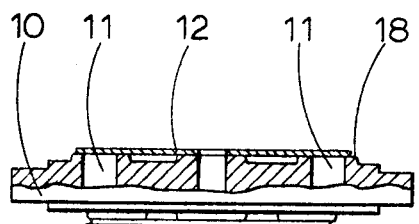
FIGS. 6 and 7 are transverse cross-sectional views taken on the lines indicated at VI—VI and VII—VII in FIG. 2. (In these views the blow-off valve control leaf is omitted).
Figure 7:
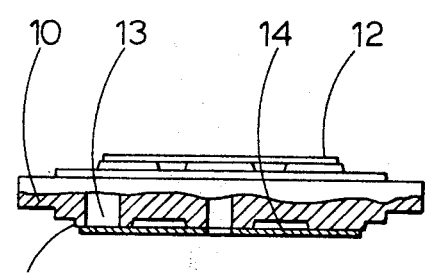
Figure 9:
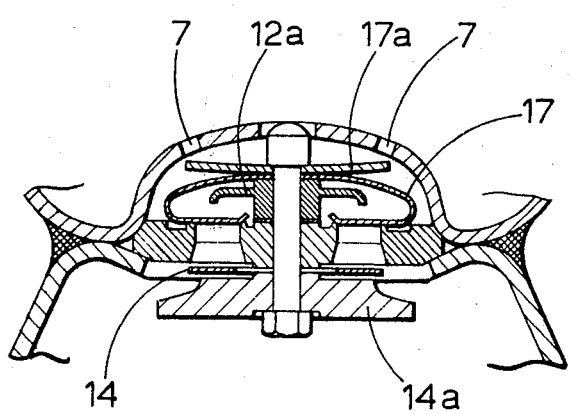
FIG. 9 is a cross-sectional view similar to FIG. 8 but which has been included to show how members can be placed behind the port closing leaves to control their flexing in opening the ports.

The leaves 12 and 14 may be stiffened by reinforcing leaves 20 as shown in FIGS. 4 and 5, for example, and as shown in better detail in FIG. 9, the blow off port covering leaf spring 17 may be stiffened by a backing plate 17a. In the embodiment of FIG. 9, the bump port closure leaf spring 12 has behind it a backing plate 12a while the rebound closure leaf spring 14 has behind it a backing plate 14a. The functions of the backing plates 12a, 14a and 17a is to control the flexing movements of the leaves behind which they are placed. They limit the maximum movement of each leaf and may be shaped to stiffen each leaf.

The backing plate 12a is integral with a spacer sleeve 12b which limits movement of the central region of the spring 17 towards the port plate and provides correct assembly and preloading.

In operation liquid flow between the displacer chamber 1 and the spring chamber 3 past the valve 2 will be controlled during the various non-distinct overlapping shock regimes as follows:

Low volume, low velocity, low shock flow will be catered for by the bleed ports 15 only, at liquid pressures below that required to open any of the flap covered valve ports.

At medium pressure the main bump ports will open with, at higher pressure, the blow-off bump ports opening to prevent severe shock forces being generated as the associated wheel rises sharply relative to the body structure of the vehicle to which the unit is fitted.

Rebound flow will take place mainly through the rebound valve ports 13.

It will be appreciated that appropriate flow and damping characteristics can be achieved by adjustments which can be made in a variety of ways, for example sizing of the various ports or choosing appropriate stiffness of the various metal leaves. However, once settled a semi permanent characteristics can be achieved and maintained. An adequate degree of predictability in quantity production can also be achieved.

What is claimed is:

1. A damper valve arranged in a liquid conduit to control flow through the conduit in both directions, and comprising an apertured port plate with resilient flaps covering the ports so that fluid flow can only take place unidirectionally through a flap covered port, the valve having
  a. a pair of main bump ports (11) covered by a centrally anchored elongate metal leaf (12) disposed on a first side of the port plate (10),
  b. a pair of rebound ports (13) similarly covered by a centrally anchored elongate metal leaf (14) disposed on the second side of the port plate (10),
  c. said pairs of bump and rebound ports (11 and 13) being of generally similar size, characterized in that there are provided at locations substantially co-planar with said main bump ports, two blow-off bump ports (16) which are larger than said main bump ports (11), which blow-off bump ports are covered by a separate centrally anchored bow-shaped metal leaf spring (17) which bridges the leaf spring closing the main bump ports and has its ends curved inwardly and shaped to constitute a pair of valving flaps, which inwardly curved flaps are preloaded against the blow-off bump ports (16) to such extent that said blow-off bump ports (16) are arranged to open only when the fluid pressure, in bump flow, rises substantially above the pressure corresponding to opening of the main bump valve ports (11).

2. A damper valve according to claim 1, further characterised in that the main bump port covering leaf (12) and the blow-off port covering leaf (17) are both anchored to the port plate (10) by a single anchorage pin (20).

3. A damper valve according to either of claims 1 or 2, further characterised in that the leaves (12 and 14) covering respectively the main bump ports (11) and the rebound flow control ports (13) are both planar elongate steel bodies of a thickness of from 0.25 to 0.75 mm, while blow-off port covering bow-shaped leaf (17) is a spring steel leaf of similar thickness whose legs are curved in reverse to form inwardly directed flaps, which terminate in lips curved through a further 30° to 50°.

4. A damper valve according to claim 3, wherein the planar leaves (12 and 14) are tapered in width from a widest centrally anchored region towards a port covering extremity.

5. A damper valve according to any preceding claim further characterised in that, stiffening means are provided behind each port covering leaf (12, 14 or 17) which means limit the movement of the leaf as it flexes to uncover its associated valve ports.

6. A damper valve according to any preceding claim further characterised in that, in addition to said covered main bump, blow-off bump and rebound ports (11, 13 and 16), there is provided at least one through hole (15) in said port plate (10) which is not covered by a valve flap, and which therefore allows bleed flow in both directions past the port plate (10).

7. A damper valve according to any preceding claim further characterised in that, each valve flap covered port is surrounded by a narrow ridge upstanding from the port plate the leaves covering the ports making annular contact with said ridges to obtain port closure.

* * * * *